(12) United States Patent
Yunoki et al.

(10) Patent No.: US 6,639,018 B2
(45) Date of Patent: Oct. 28, 2003

(54) POLYPROPYLENE RESIN COMPOSITION AND PROCESS FOR PRODUCING THE SAME

(75) Inventors: Shunji Yunoki, Sapporo (JP); Takeshi Ebara, Chiba (JP); Yoichi Obata, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 24 days.

(21) Appl. No.: 10/080,705

(22) Filed: Feb. 25, 2002

(65) Prior Publication Data

US 2002/0177657 A1 Nov. 28, 2002

(30) Foreign Application Priority Data

Feb. 27, 2001 (JP) ........................ 2001-051727

(51) Int. Cl.⁷ ............................ C08L 23/00; C08L 23/04
(52) U.S. Cl. ........................ 525/191; 525/240
(58) Field of Search .................... 525/191, 240

(56) References Cited

U.S. PATENT DOCUMENTS 6,300,415 B1 * 10/2001 Okayama et al. ........... 525/191

FOREIGN PATENT DOCUMENTS

| JP | 57-185336 | 11/1982 |
| JP | 6-240068 | 8/1994 |
| JP | 6-248133 | 9/1994 |

* cited by examiner

Primary Examiner—Nathan M. Nutter
(74) Attorney, Agent, or Firm—Birch, Stewart, Kolasch & Birch, LLP

(57) ABSTRACT

A polypropylene resin composition having a melt flow rate of 0.5 to 20 g/10 min., comprising 20 to 98 parts by weight of a propylene-based polymer (A) having an intrinsic viscosity [η] measured in tetralin at 135° C. of 2.0 to 5 dl/g and a melting point Tm determined from the peak temperature of the melting curve measured by a differential scanning calorie meter of 140 to 162° C. and 2 to 80 parts by weight of a propylene-based polymer B having an intrinsic viscosity [η] measured in tetralin at 135° C. of 0.80 to 1.8 dl/g and a melting point Tm determined from the peak temperature of the melting curve measured by a differential scanning calorie meter of 160 to 166° C. and a process for producing the same.

6 Claims, No Drawings

POLYPROPYLENE RESIN COMPOSITION AND PROCESS FOR PRODUCING THE SAME

BACKGROUND OF THE INVENTION

1. Field of the Invention

The present invention relates to a polypropylene resin composition and a process for producing the same. More particularly, the present invention relates to a polypropylene resin composition excellent in rigidity, impact resistance and balance of these properties, and to a process for producing the same.

2. Description of Prior Arts

Polypropylene resins such as propylene homopolymers, propylene-based block polymers and propylene-based random copolymers are used in wide applications due to relatively excellent rigidity and impact resistance. As the polypropylene resin, propylene homopolymers, propylene-based block polymers and propylene-based random copolymers are generally known.

The propylene-based block polymer is a propylene resin composition obtained by copolymerizing propylene with ethylene and/or α-olefin having 4 or more carbon atoms to produce a copolymer part in which a repeating unit derived from propylene, a repeating unit derived from ethylene and/or a repeating unit derived from the α-olefin are randomly bonded and subsequently copolymerizing those to produce a copolymer part having a different structure from that of the above-mentioned copolymer part, in which a propylene repeating unit, an ethylene repeating unit and/or the α-olefin repeating unit are randomly bonded.

However, a film obtained by using the propylene-based block copolymer is inferior in film appearance such as transparency as compared with a film obtained by using a propylene homopolymer or propylene-based random copolymer, therefore, particularly in the field of films, propylene homopolymers or propylene-based random copolymers are used.

For example, JP57-185336A describes a polypropylene resin composition composed of (I) a crystalline propylene homopolymer or copolymer of propylene with another α-olefin having an intrinsicviscosity [η] of 0.6 to 2.5 dl/g, and (II) a crystalline propylene homopolymer or copolymer of propylene with another α-olefin having an intrinsic viscosity [η] of 2.5 to 10 dl/g and an intrinsic viscosity [η] 2-fold or more of that of (I), which has a molding processability improved without damaging mechanical properties such as rigidity, impact resistance and the like, transparency, heat resistance and chemical resistance and which avoids a trouble of fish eye generation.

However, the polypropylene resin composition disclosed in the above-mentioned JP 57-185336A is insufficient in impact resistance though it is high rigidity due to high crystallinity, since the lower molecular weight component (I) used in examples of the above-mentioned JP 57-185336A has an isotactic index of at least 94.8% and the higher molecular weight component (II) has an isotactic index of at least 92.3%. Therefore, improvement in balance of rigidity and impact resistance is desired.

Further, JP06-240068A discloses a polypropylene composition containing an ultrahigh molecular weight polypropylene having an intrinsic viscosity of 5.0 dl/g or more and a low molecular weight polypropylene having an intrinsic viscosity of 0.03 to 3.5 dl/g and an isotactic pentad fraction of 0.960 or more, which is excellent in mechanical properties such as rigidity, heat resistance and the like and has excellent flowability in molding.

However, the ultrahigh molecular weight polypropylene having an intrinsic viscosity of 5.0 dl/g or more used in examples of the above-mentioned JP06-240068A is polymerized according to a method described in JP03-007704A, and an ultrahigh molecular weight polypropylene described in JP03-007704A has an isotactic pentad fraction of 0.960 or more. Further, the above-mentioned low molecular weight polypropylene used in the JP06-240068A also has an isotactic pentad fraction of 0.960 or more. Therefore, also the above-mentioned polypropylene composition described in the JP06-240068A has insufficient impact resistance, consequently, there is a desired for improvement in balance of rigidity and impact resistance.

JP06-248133A describes a polypropylene composition composed of (IA) a high molecular weight polypropylene having an intrinsic viscosity [η] of 1.0 or more and a pentad fraction of 0.90 or more and (IIA) a highly stereoregular polypropylene having a [η] of 0.1 to 0.8 and a pentad proportion of 0.93 or more, which is rich in molding processability and has good balance in physical properties between rigidity and impact resistance.

However, the rigidity of the composition does not necessarily sufficient. Therefore, for sufficiently improving the rigidity by using the IIA, it is necessary to increase the use amount of the IIA, and resultantly, impact resistance becomes insufficient, and also the above-mentioned polypropylene composition described in JP06-248133A is desired to have improved rigidity and balance of rigidity and impact resistance.

SUMMARY OF THE INVENTION

In view of the above-mentioned situations, the present inventors have intensively studied, and resultantly, found that a polypropylene resin composition having a specified melt flow, comprising: a propylene-based polymer (A) having a specified intrinsic viscosity and melting point; and a propylene-based polymer (B) having a specific intrinsic viscosity and melting point, can solve the above-described problems, leading to completion of the present invention.

An object of the present invention is to provide a polypropylene resin composition excellent in rigidity, impact resistance and balance of rigidity and impact resistance and a process for producing the polypropylene resin composition.

Namely, the present invention relates to a polypropylene resin composition having a melt flow rate of 0.5 to 20 g/10 min., comprising 20 to 98 parts by weight of a propylene-based polymer (A) having an intrinsic viscosity [η] measured in tetralin at 135° C. of 2.0 to 5 dl/g and a melting point (Tm) determined from the peak temperature of the melting curve measured by a differential scanning calorimeter (herein-after, abbreviated as "DSC") of 140 to 162° C. and 2 to 80 parts by weight of a propylene-based polymer (B) having an intrinsic viscosity [7] measured in tetralin at 135° C. of 0.80 to 1.8 dl/g and a melting point (Tm) determined from the peak temperature of the melting curve measured by DSC of 160 to 166° C., and a process for producing the resin composition.

The present invention will be described in detail below.

DETAILED DESCRIPTION OF THE INVENTION

The propylene-based polymer A and the propylene-based polymer B used in the present invention are propylene homopolymers or propylene-based random copolymers.

The propylene-based random copolymer is a random copolymer obtained by copolymerizing propylene with ethylene and/or at least one comonomer selected from α-olefins having 4 to 20 carbon atoms.

Examples of the α-olefin having 4 to 20 carbon atoms include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, 5-methyl-1-hexene, 3,4-dimethyl-1-pentene, 4-ethyl-1-pentene, 4-trimethyl-1-butene, 3-methylethyl-1-butene, 1-octene, 4-methyl-1-pentene, 5-ethyl-1-hexene, 4,5-dimethyl-1-hexene, 6-propyl-1-heptene, 5,6-methylethyl-1-heptene, 5-trimethyl-1-pentene, 4-propyl-1-pentene, 3-diethyl-1-butene, 1-nonene, 1-decene, 1-undecene, 1-dodecene and the like. Preferable are 1-butene, 1-pentene, 1-hexene and 1-octene, more preferable are 1-butene and 1-hexene.

Examples of the propylene-based random copolymer include a propylene-ethylene random copolymer, propylene-α-olefin random copolymer, propylene-ethylene-α-olefin random copolymer and the like.

Examples of the propylene-α-olefin random copolymer include a propylene-1-butene random copolymer, propylene-1-hexene random copolymer and the like, and examples of the propylene-ethylene-α-olefin random copolymer include a propylene-ethylene-1-butene random copolymer, propylene-ethylene-1-hexene random copolymer and the like. The propylene-based random copolymer is preferably a propylene-ethylene random copolymer, propylene-1-butene random copolymer or propylene-ethylene-1-butene random copolymer.

The propylene-based polymer (A) used in the present invention has an intrinsic viscosity [η] measured in tetralin at 135° C. of from 2.0 to 5 dl/g, preferably from 2.5 to 4 dl/g. When the intrinsic viscosity [η] is less than 2.0 dl/g, the resulted polypropylene resin composition may have insufficient balance of rigidity and impact resistance, and when over 5 dl/g, the resulted polypropylene resin composition may have lowered flowability in extrusion processing, and fish eyes may generate in formed into a film.

The propylene-based polymer (A) used in the present invention has a melting point (Tm) determined from the peak temperature of the melting curve measured by DSC of 140 to 162° C., preferably 143 to 160° C., more preferably 147 to 158° C. When the melting point (Tm) is less than 140° C., the resulted polypropylene resin composition may have lowered in rigidity, and when over 162° C., the resulted polypropylene resin composition may have lowered in impact resistance.

The propylene-based polymer (A) used in the present invention is preferably a propylene-based random copolymer.

When the propylene-based polymer (A) used in the present invention is a propylene-ethylene random copolymer, the ethylene content is preferably up to 4.0% by weight, more preferably up to 3.5% by weight, further preferably up to 3.0% by weight, from the standpoint of the rigidity of the resulted polypropylene resin composition.

When the propylene-based polymer (A) used in the present invention is a propylene-α-olefin random copolymer, the α-olefin content is preferably up to 15% by weight, more preferably up to 12% by weight, further preferably up to 10% by weight, from the standpoint of the rigidity of the resulted polypropylene resin composition.

When the propylene-based polymer (A) used in the present invention is a propylene-ethylene-α-olefin random copolymer, the total content of ethylene and α-olefin is preferably up to 15% by weight, more preferably up to 12% by weight, further preferably up to 10% by weight, from the standpoint of the rigidity of the resulted polypropylene resin composition.

The propylene-based polymer (B) used in the present invention has an intrinsic viscosity [η?] measured in tetralin at 135° C. of from 0.8 to 1.8 dl/g, preferably from 0.85 to 1.7 dl/g, more preferably from 0.9 to 1.6 dl/g. When the limiting viscosity [η] is less than 0.8 dl/g, the resulted polypropylene resin composition may have lowered impact resistance, and when over 1.8 dl/g, the resulted polypropylene resin composition may have insufficient balance of rigidity and impact resistance.

The propylene-based polymer (B) used in the present invention has a melting point (Tm) determined from the peak temperature of the melting curve measured by DSC of 160 to 166° C. When Tm is less than 160° C., the resulted polypropylene resin composition may have lowered rigidity, and when over 166° C., the resulted polypropylene resin composition may have lowered impact resistance.

The propylene-based polymer (B) used in the present invention is preferably a propylene homopolymer.

When the propylene-based polymer (B) used in the present invention is a propylene-ethylene random copolymer, the ethylene content is preferably 1.5% by weight or less, more preferably 1.2% by weight or less, further preferably 1.0% by weight or less, from the standpoint of the rigidity of the resulted polypropylene resin composition.

When the propylene-based polymer (B) used in the present invention is a propylene-α-olefin random copolymer, the α-olefin content is preferably 6% by weight or less, more preferably 4% by weight or less, further preferably 3% by weight or less, from the standpoint of the rigidity of the resulted polypropylene resin composition.

When the propylene-based polymer (B) used in the present invention is a propylene-ethylene-α-olefin random copolymer, the total content of ethylene and α-olefin is preferably 6% by weight or less, more preferably 4% by weight or less, further preferably 3% by weight or less, from the standpoint of the rigidity of the resulted polypropylene resin composition.

The content of the propylene-based polymer (A) in the polypropylene resin composition of the present invention is from 20 to 98 parts by weight, preferably from 25 to 96 parts by weight, more preferably from 30 to 94 parts by weight. When the content of the propylene-based polymer (A) is less than 20 parts by weight or over 98 parts by weight, the resulted propylene resin composition may have insufficient balance of rigidity and impact resistance.

The content of the propylene-based polymer (B) in the polypropylene resin composition of the present invention is from 2 to 80 parts by weight, preferably from 4 to 75 parts by weight, more preferably from 6 to 70 parts by weight. Herein, the total of (A) and (B) is 100 parts by weight. When the content of the propylene-based polymer (B) is less than 2 parts by weight or over 80 parts by weight, the resulted propylene resin composition may have insufficient balance of rigidity and impact resistance.

The polypropylene resin composition of the present invention has a melt flow rate of 0.5 to 20 g/10 min., preferably 1 to 10 g/10 min. When the melt flow rate is less than 0.5 g/10 min., the flowability in extrusion processing may be insufficient, and when over 20 g/10 min., impact resistance and stability of a resin composition during melt extrusion may decrease.

The polypropylene resin composition of the present invention is obtained by the following processes:

(1) A process for producing a polypropylene resin composition, which comprises producing a propylene-based polymer (A) and a propylene-based polymer (B) each individually by respectively homo-polymerizing propylene or random-copolymerizing propylene with ethylene and/or an a-olefin having 4 to 12 carbon atoms, and mixing the propylene-based polymers (A) with the propylene-based polymer (B) obtained by the individual polymerization; or (2) a process for producing a polypropylene resin composition by a multi-stage polymerization process having two or more polymerization stages, which comprises homo-polymerizing propylene or random-copolymerizing propylene with ethylene and/or an α-olefin having 4 to 12 carbon atoms to produce the propylene-based polymer (A), and homo-polymerizing propylene or random-copolymerizing propylene with ethylene and/or an α-olefin having 4 to 12 carbon atoms to produce the propylene-based polymer (B), wherein the propylene-based polymer (A) and the propylene-based polymer (B) are produced in any stage of the polymerization stages.

In the process (1) described above, each of polymerization methods for producing the propylene-based polymer A and the propylene-based polymer B, individually, is not particularly restricted, and known polymerization methods are adopted. For example, a solvent polymerization method conducted in the presence of an inert solvent, a block polymerization method conducted in the presence of a liquid monomer, a gas phase polymerization method conducted in the substantial absence of a liquid medium, and the like are listed. Preferable is a gas phase polymerization method. Further, polymerization methods combining two or more of the above-mentioned polymerization methods, two or more multi-stage polymerization methods, and the like are also listed.

The method of mixing the propylene-based polymer (A) and the propylene-based polymer (B) obtained by individual polymerization is not particularly restricted, and methods capable of dispersing these polymer (A) and polymer (B) uniformly may be permissible. There are mentioned, for example, (i) a method of mixing the polymer (A) and the polymer (B) by a ribbon blender, Henschel mixer, tumbler mixer or the like and melt-kneading the mixture by an extruder or the like, (ii) a method of melt-kneading and pelletizing the polymer (A) and the polymer (B) each individually, mixing the pelletized polymer (A) and polymer (B) by the same method as described above, further, melt-kneading the mixture, (iii) a method of previously preparing a master batch containing 1 to 99 parts by weight of the propylene-based polymer (A) based on 100 parts by weight of the propylene-based polymer (B), and mixing appropriately the master batch with the polymer (A) or (B) so as to obtain a predetermined concentration, or the like.

Further, at mixing of the propylene-based polymer A and the propylene-based polymer B obtained by individual polymerization, a stabilizer, lubricant, antistatic agent, anti-blocking agent, inorganic and organic various fillers and the like may also be added in an amount causing no deterioration of the object of the present invention.

In the process (2) described above, a method of polymerization in each stage of the multi-stage polymerization is not particularly restricted, and known polymerization methods are listed. For example, there are listed methods in which a solvent polymerization method conducted in the presence of an inert solvent, a block polymerization method conducted in the presence of a liquid monomer, a gas phase polymerization method conducted in the substantial absence of a liquid medium, and the like are arbitrarily combined in at least two stages, and the propylene-based polymer (A) and the propylene-based polymer (B) are produced in any stage.

For example, the propylene-based polymer (A) may be produced in first one or more stages of the multi-stage polymerization and the propylene-based polymer (B) is subsequently produced in the subsequent one or more stages of the multi-stage polymerization. On the contrary, the propylene-based polymer (B) may be produced prior to production of the propylene-based polymer (A) in the multi-stage polymerization.

A polypropylene resin composition obtained by the method in which the multi-stage polymerization method is used and the propylene-based polymer (A) and the propylene-based polymer (B) are produced in any stage may be further mixed, and as the method of further mixing, for example, a method of melt-kneading by an extruder or the like, is mentioned. In the further mixing, a stabilizer, lubricant, antistatic agent, anti-blocking agent, inorganic and organic various fillers and the like may also be added in an amount causing no deterioration of the object of the present invention.

As a catalyst used for producing the propylene-based polymer (A) and the propylene-based polymer (B) used in the present invention, catalysts for stereoregular polymerization of propylene are used both in the case of individual polymerization of the polymers and in the case of use of a multi-stage polymerization method.

As the catalyst for stereoregular polymerization of propylene, for example, a titanium trichloride catalyst, a catalyst system obtained by combining a solid catalyst component such as a Ti—Mg catalyst or the like containing titanium, magnesium, halogen and electron donor as essential components with an organoaluminum compound and optionally a third component such as an electron donative compound or the like, and a metallocene catalyst are listed.

Preferable are catalyst systems obtained by combining solid catalyst components containing magnesium, titanium, halogen and electron donor as essential components with an organoaluminum compound and an electron donative compound, and specific examples thereof include catalyst systems described in U.S. Pat. Nos. 4,672,050, 4,743,665 and 5,608,018, and the like.

EXAMPLES

The following examples will describe the present invention further in detail below, but do not limit the scope of the invention.

(1) Structural Values of Propylene-Based Polymer A and Propylene-Based Polymer B The structural values of the propylene-based polymer A and the propylene-based polymer B used in Examples and Comparative Examples were measured according to the following methods.

(1-1) Intrinsic Viscosity [η] (Unit: dl/g)

It was measured by a Ubbellohde viscometer at a temperature of 135° C. using tetralin as a solvent.

(1-2) Meso Pentad Fraction

As the meso pentad fraction, the peak intensity ratio of the pentad fraction mmrr (peak measured around 21.01 ppm on the basis of TMS) to the pentad fraction mmmm (peak measured around 21.78 ppm on the basis of TMS) in pentamer units in the polypropylene molecule chain obtained by measuring a solution of a propylene-based polymer in o-dichlorobenzene (containing 20% by weight of $C_6D_6$) (concentration of propylene-based polymer: 150 mg/3 ml) at 135° C. and 267.5 MHz using $^{13}$C-NMR (EX-270, manufactured by JEOL Ltd.) based on the literature published by A. Zambelli et al. in Macromolecules, 13, 687–689 (1975), was used.

(1-3) Amount of Cold Xylene-Soluble Component (CXS) (Unit: wt %)

10 g of a propylene-based polymer was dissolved in 1000 ml of boiling xylene, then, the resulted solution was gradually cooled to 50° C., subsequently, cooled to 20° C. with an ice water while stirring, and allowed to stand over night at 20° C. Thus precipitated polymer was filtrated, xylene was evaporated from the filtrate, and the residue was dried under reduced pressure at 60° C. to recover a polymer soluble in xylene at 20° C., and the polymer soluble in xylene at 20° C. recovered was weighted to determine CXS.

(1-4) Comonomer Content (Unit: wt %)

① Ethylene content: It was determined by an IR spectrum method described in the column of "(i) Random Copolymer", Polymer Analysis Handbook, p. 256 (1985, published by Asakura Shoten K. K.).

② 1-Butene content: It was determined by an IR spectrum method according to the following formula.

1-Butene content (wt %)=1.208 K'

K': absorbance at 767 cm$^{-1}$ (1-5) Melting Point (Tm) (Unit: C)

Using a differential scanning calorimeter (DSC-7 manufactured by Perkin Elmer), a propylene-based polymer was heated at 220° C. for 5 minutes, then, cooled down to 150° C. at a cooling rate of 300° C./min. and kept for 1 minute at 15° C., further cooled down to 5° C. at a cooling rate of 5° C./min. and kept for 1 minute at 50° C., then, heated from 50° C. to 180° C. at a heating rate of 5° C./min., and the melting peak temperature was read as the melting point (Tm) (C).

(2) Production of Propylene-Based Polymer A and Propylene-Based Polymer B (2-1) Polymerization Catalyst For polymerization of the propylene-based polymer A and the propylene-based polymer B used in examples of the present invention and comparative examples, a stereoregular polymerization catalyst system described in Example 1 of U.S. Pat. No. 5,608,018 was used.

(2-2)

A-1, A-2, A-3 and A-4 as the propylene-based polymer A, and B-1, B-2, B-3 and B-4 as the propylene-based polymer B were produced. The production conditions and structural values are shown below. The structural values of the propylene-based polymer A and the propylene-based polymer B are shown also in Table 1.

(a-1) Propylene-Based Polymer A-1

A propylene homopolymer powder having an intrinsicviscosity [η] of 2.11 dl/g, a meso-pentad fraction of 0.883, a CXS of 2.7 wt % and Tm of 160.4° C. was obtained by a gas phase polymerization method (catalyst: Al/Ti molar ratio of 490, cyclohexylethyldimethoxysilane (Z)/Ti molar ratio of 3, polymerization condition: 83° C., 2.1 MPa).

(a-2) Propylene-Based Polymer A-2

A propylene-1-butene random copolymer having a [η] of 7.03 dl/g, a 1-butene content of 13.6 wt % and a CXS of 1.2 wt % was obtained by bulk polymerization method (catalyst: Al/Ti molar ratio of 110, Z/Ti molar ratio of 18, polymerization condition: 60° C., 2.1 MPa).

To 100 parts by weight of the resulted polymer powder, 0.1 part by weight of calcium stearate as a stabilizer, 0.1 part by weight of an antioxidant (trade name: Irganox 1010, manufactured by Ciba Specialty Chemicals), 0.1 part by weight of an antioxidant (trade name: Irgafos 168, manufactured by Ciba Specialty Chemicals) and 0.15 parts by weight of a peroxide-containing polypropylene (hereinafter, referred to as peroxide-containing PP) in which 8 parts by weight of a peroxide (trade name: Perhexa 25B, manufactured by NOF Corp.) was impregnated with 92 parts by weight of polypropylene, then, peroxide decomposition was conducted at 220° C. using a 20 mm φ extruder. As a result, a propylene-1-butene random copolymer pellet having a [η] of 3.34 dl/g, a CXS of 1.0 wt % and a Tm of 141.8° C. was obtained.

(a-3) Propylene-Based Polymer A-3

A propylene-1-butene random copolymer having a [7)] of 7.10 dl/g, a 1-butene content of 7.4 wt % and a CXS of 1.7 wt % was obtained by bulk polymerization method (catalyst: Al/Ti molar ratio of 150, Z/Ti molar ratio of 13, polymerization condition: 65° C., 2.4 MPa). Peroxide decomposition was conducted by the same manner as in the production of the propylene-based polymer A-2 except that the addition amount of the peroxide-containing PP was changed to 0.47 parts by weight based on 100 parts by weight of the resulted polymer powder. As a result, a propylene-1-butene random copolymer pellet having a [η] of 2.40 dl/g, a CXS of 1.6 wt % and a Tm of 149.6° C. was obtained.

(a-4) Propylene-Based Polymer A-4

A propylene homopolymer having a [η] of 2.86 dl/g, a meso-pentad fraction of 0.959, a CXS of 0.9 wt % and a Tm of 162.5° C. was obtained by a gas phase polymerization method (catalyst: Al/Ti molar ratio of 450, Z/Ti molar ratio of 8, polymerization condition: 83° C., 2.1 MPa).

(b-1) Propylene-Based Polymer B-1

A propylene homopolymer powder having a [7 ] of 0.94 dl/g, a meso-pentad fraction of 0.980, a CXS of 0.56 wt % and a Tm of 162.1° C. was obtained by a gas phase polymerization method (catalyst: Al/Ti molar ratio of 450, Z/Ti molar ratio of 8, polymerization condition: 83° C., 2.1 MPa).

(b-2) Propylene-Based Polymer B-2

A propylene homopolymer powder having a [η] of 1.59 dl/g, a meso-pentad fraction of 0.952, a CXS of 1.2 wt % and a Tm of 162.4° C. was obtained by a gas phase polymerization (catalyst: Ti/Al molar ratio of 550, Z/Ti molar ratio of 100, polymerization condition: 83° C., 2.1 MPa).

(b-3) Propylene-Based Polymer B-3

An ethylene-propylene random copolymer having a ([] of 1.27 dl/g, an ethylene content of 3.7 wt % and a CXS of 3.6 wt % was obtained by gas phase polymerization method (catalyst: Al/Ti molar ratio of 600, Z/Ti molar ratio of 40, polymerization condition: 81° C., 2.1 MPa). Peroxide decomposition was conducted by the same manner as in the production method of the propylene-based polymer A-2 except that the addition amount of the peroxide-containing PP was changed to 0.6 parts by weight based on 100 parts by weight of the resulted polymer powder. As a result, an ethylene-propylene random copolymer pellet having a [η] of 0.97 dl/g, a CXS of 3.4 wt % and a Tm of 141.8° C. was obtained.

(b-4) Propylene-Based Polymer B-4

A propylene homopolymer powder having a [η] of 0.77 (dl/g), a meso-pentad fraction of 0.983, a CXS of 0.36 wt % and a Tm of 161.8° C. was obtained by a solvent polymerization method (catalyst: Al/Ti molar ratio of 66.78, Z/Ti molar ratio of 19, solvent: hexane, polymerization temperature: 75° C.)

(3) Measurement of Physical Properties of Propylene Resin Composition

The physical properties of propylene resin compositions in Examples and Comparative Examples were measured according to the following methods.

(3-1) Melt Flow Rate (MFR) (Unit: g/10 min.)
It was measured according to JIS K7210.
(3-2) Flexural modulus (unit: MPa)
A pressed sheet having a thickness of 1 mm prepared according to JIS K6758 was conditioned in a thermo-hygrostat chamber of a temperature of 23° C. and a humidity of 50% for 72 hours to give a test piece and the flexural modulus thereof was measured according to JIS K7106.
(3-3) Tensile Impact (Unit: kJ/m$^2$)
The tensile impact was measured according to ASTM D 1822 using a specimen punched by a type S dumbbell from a press sheet having a thickness of 1 mm obtained by molding and conditioning in the same manners as in the above-mentioned measurement of (3-2) flexural modulus.

Example 1

80 parts by weight of a powder of the propylene polymer A-1, 20 parts by weight of a powder of the propylene polymer B-1, 0.1 part by weight of calcium stearate as a stabilizer, 0.15 parts by weight of an antioxidant (trade name: Irganox 1010) and 0.1 part by weight of an antioxidant (trade name: Irgafos 168) were mixed by a Henschel mixer, then, granulated at 220° C. by a 20 mmφ extruder and pelletized. The melt flow rate (MFR), flexural modulus and tensile impact were measured according to the above-mentioned methods. The results are shown in Table 2.

Example 2

50 parts by weight of a pellet of the propylene polymer A-3, 50 parts by weight of a powder of the propylene polymer B-2, 0.05 parts by weight of calcium stearate as a stabilizer, 0.075 parts by weight of an antioxidant (trade name: Irganox 1010) and 0.05 parts by weight of an antioxidant (trade name: Irgafos 168) were mixed by a Henschel mixer, then, granulated at 220° C. by a 20 mmφ extruder and pelletized. MFR, flexural modulus and tensile impact were measured according to the above-mentioned methods. The results are shown in Table 2.

Example 3

50 parts by weight of a pellet of the propylene polymer A-2, 50 parts by weight of a powder of the propylene polymer B-2, 0.05 parts by weight of calcium stearate as a stabilizer, 0.075 parts by weight of an antioxidant (trade name: Irganox 1010) and 0.05 parts by weight of an antioxidant (trade name: Irgafos 168) were mixed by a Henschel mixer, then, granulated at 220° C. by a 20 mmφ extruder and pelletized. MFR, flexural modulus and tensile impact were measured according to the above-mentioned methods. The results are shown in Table 2.

Comparative Example 1

100 parts by weight of a powder of the propylene polymer A-1, 0.1 part by weight of calcium stearate as a stabilizer, 0.15 parts by weight of an antioxidant (trade name: Irganox 1010) and 0.1 part by weight of an antioxidant (trade name: Irgafos 168) were mixed by a Henschel mixer, then, granulated at 220° C. by a 20 mmφ extruder and pelletized. MFR, flexural modulus and tensile impact were measured according to the above-mentioned methods. The results are shown in Table 2.

Comparative Example 2

60 parts by weight of a powder of the propylene polymer A-4, 40 parts by weight of a pellet of the propylene polymer B-3, 0.06 parts by weight of calcium stearate as a stabilizer, 0.09 parts by weight of an antioxidant (trade name: Irganox 1010) and 0.06 parts by weight of an antioxidant (trade name: Irgafos 168) were mixed by a Henschel mixer, then, granulated at 220° C. by a 20 mmφ extruder and pelletized. MFR, flexural modulus and tensile impact were measured according to the above-mentioned methods. The results are shown in Table 2.

Comparative Example 3

90 parts by weight of a powder of the propylene polymer A-1, 10 parts by weight of a powder of the propylene polymer B-4, 0.1 part by weight of calcium stearate as a stabilizer, 0.15 parts by weight of an antioxidant (trade name: Irganox 1010) and 0.1 part by weight of an antioxidant (trade name: Irgafos 168) were mixed by a Henschel mixer, then, granulated at 220° C. by a 20 mmφ extruder and pelletized. MFR, flexural modulus and tensile impact were measured according to the above-mentioned methods. The results are shown in Table 2.

TABLE 1

| Name of sample | [η] (dl/g) | Pentad fraction | CXS (wt %) | Comonomer content (wt %) | Tm (° C.) |
|---|---|---|---|---|---|
| A-1 | 2.11 | 0.883 | 2.7 | 0 | 160.4 |
| A-2 | 3.34 | — | 1.0 | 1-butene 13.6 | 141.8 |
| A-3 | 2.40 | — | 1.6 | 1-butene 7.4 | 149.6 |
| A-4 | 2.86 | 0.959 | 0.9 | 0 | 162.5 |
| B-1 | 0.94 | 0.980 | 0.56 | 0 | 162.1 |
| B-2 | 1.59 | 0.952 | 1.2 | 0 | 162.4 |
| B-3 | 0.97 | — | 3.4 | Ethylene 3.7 | 141.8 |
| B-4 | 0.77 | 0.983 | 0.36 | 0 | 161.8 |

TABLE 2

| | Preparation of polypropylene resin composition | | | | | |
|---|---|---|---|---|---|---|
| | Propylene-based polymer (A) | Propylene-based polymer (B) | Blending ratio (A/B) (part by weight/ part by weight) | MFR (g/10 min.) | Flexural modulus (Mpa) | Tensile impact (kJ/m$^2$) |
| Example 1 | A-1 | B-1 | 80/20 | 4.5 | 1480 | 59 |
| Example 2 | A-3 | B-2 | 50/50 | 2.5 | 1480 | 54 |
| Example 3 | A-2 | B-2 | 40/60 | 1.4 | 1420 | 62 |
| Comparative Example 1 | A-1 | — | 100/0 | 2.2 | 1410 | 58 |
| Comparative Example 2 | A-4 | B-3 | 60/40 | 3.3 | 1390 | 51 |
| Comparative Example 3 | A-1 | B-4 | 90/10 | 3.3 | 1420 | 51 |

It is understood that the polypropylene resin compositions of Examples 1 to 3 satisfying the requirements of the present invention are excellent in balance of rigidity (flexural modulus) and impact resistance (tensile impact).

On the other hand, it is understood that the polypropylene resin compositions in Comparative Example 1 using no propylene-based polymer B which is required in the present invention, Comparative Example 2 not satisfying melting points (Tm) of the propylene-based polymer A and the propylene-based polymer B required in the present invention and Comparative Example 3 not satisfying [η] of the propylene-based polymer B required in the present invention have all insufficient balance of rigidity (flexural modulus) and impact resistance (tensile impact).

As described in detail above, according to the present invention, a polypropylene resin composition excellent in rigidity, impact resistance and balance of rigidity and impact resistance is provided.

What is claimed is:

1. A polypropylene resin composition having a melt flow rate of 0.5 to 20 g/10 min., comprising:
   20 to 98 parts by weight of a propylene-based polymer (A) having an intrinsic viscosity [η] measured in tetralin at 135° C. of 2 to 5 dl/g and a melting point Tm determined from the peak temperature of the melting curve measured by a differential scanning calorie meter of 140 to 162° C.; and
   2 to 80 parts by weight of a propylene-based polymer B having an intrinsic viscosity [η] measured in tetralin at 135° C. of 0.8 to 1.8 dl/g and a melting point Tm determined from the peak temperature of the melting curve measured by a differential scanning calorie meter of 160 to 166° C., wherein the total amount of the propylene-based polymers (A) and (B) is 100 parts by weight.

2. The polypropylene resin composition according to claim 1, wherein the propylene-based polymer (A) and (B) have intrinsic viscosities [η] of 2.5 to 4 dl/g and 0.85 to 1.7 dl/g, respectively.

3. The polypropylene resin composition according to claim 1, wherein the respective propylene-based polymer (A) and (B) are independently a propylene homopolymer, propylene-ethylene random copolymer having an ethylene unit content of up to 4% by weight, propylene-ethylene-α-olefin having 4 to 12 carbon atoms random copolymer or propylene-α-olefin having 4 to 12 carbon atoms random copolymer having an α-olefin unit content of up to 30% by weight.

4. The polypropylene resin composition according to claim 1, wherein the α-olefin having 4 to 12 carbon atoms is an olefin selected from the group consisting of 1-butene, 1-pentene, 1-hexene and 1-octene.

5. A process for producing the polypropylene resin composition of claim 1, comprising producing the propylene-based polymer (A) and the propylene-based polymer (B) each individually and mixing the polymer (A) and polymer (B) produced individually.

6. A process for producing the polypropylene resin composition of claim 1, wherein the propylene-based polymer (A) and the propylene-based polymer (B) are individually produced in any stage of a multi-stage polymerization.

* * * * *